(12) United States Patent
Stevens et al.

(10) Patent No.: US 9,156,055 B2
(45) Date of Patent: Oct. 13, 2015

(54) PRECURSOR SUPPLIES, MATERIAL PROCESSING SYSTEMS WITH WHICH PRECURSOR SUPPLIES ARE CONFIGURED TO BE USED AND ASSOCIATED METHODS

(71) Applicant: HZO, Inc., Draper, UT (US)

(72) Inventors: Blake Stevens, Morristown, NJ (US); Max Sorenson, Cottonwood Heights, UT (US); Liulei Cao, Salt Lake City, UT (US)

(73) Assignee: HZO, Inc., Draper, UT (US)

( * ) Notice: Subject to any disclaimer, the term of this patent is extended or adjusted under 35 U.S.C. 154(b) by 326 days.

(21) Appl. No.: 13/737,737

(22) Filed: Jan. 9, 2013

(65) Prior Publication Data

US 2013/0177699 A1 Jul. 11, 2013

Related U.S. Application Data

(60) Provisional application No. 61/585,150, filed on Jan. 10, 2012.

(51) Int. Cl.
*B05C 11/00* (2006.01)
*B65B 1/04* (2006.01)
(Continued)

(52) U.S. Cl.
CPC . *B05C 11/10* (2013.01); *B05D 1/60* (2013.01); *B65B 1/04* (2013.01); *Y10T 428/1352* (2015.01)

(58) Field of Classification Search
CPC ................................. B05C 11/00; B65B 1/04
See application file for complete search history.

(56) References Cited

U.S. PATENT DOCUMENTS

| 4,292,744 A | * | 10/1981 | Nabholz | ........................... 34/73 |
| 4,303,694 A | | 12/1981 | Bois | |
| 5,622,564 A | | 4/1997 | Vignola et al. | |

(Continued)

FOREIGN PATENT DOCUMENTS

| CN | 101659165 | 3/2010 |
| EP | 2149456 A1 | 2/2010 |

OTHER PUBLICATIONS

Bhandari, Harish B., et al., "Chemical Vapor Deposition of Cobalt Nitride and its Application as an Adhesion-Enhancing Layer for Advanced Copper Interconnects". ECS Journal of Solid State Science and Technology 1 (5) N79-N84 (2012).*

(Continued)

*Primary Examiner* — Bret Chen
(74) *Attorney, Agent, or Firm* — Durham Jones & Pinegar, P.C., Intellectual Property Law Group

(57) ABSTRACT

In various aspects and embodiments, the present disclosure relates to the manner in which precursor materials are provided to processing equipment and, more specifically, to the manner in which precursor materials of organic polymers are delivered to systems for forming and, in some embodiments, depositing the organic polymers. In one aspect, the disclosure relates to precursor supplies, which comprise vehicles, such as binders, supports and cartridges, for delivering a precursor material to a material processing system, such as a deposition system or other processing equipment. In another aspect, the disclosure relates to material processing systems with which the precursor supplies are configured to be used. Methods for preparing precursor supplies, using precursor supplies, providing process control, and recycling precursor supplies are also disclosed.

30 Claims, 2 Drawing Sheets

(51) Int. Cl.
  *B05C 11/10*   (2006.01)
  *B05D 1/00*   (2006.01)

(56) References Cited

U.S. PATENT DOCUMENTS

| | | | |
|---|---|---|---|
| 5,820,678 A * | 10/1998 | Hubert et al. | 118/690 |
| 5,904,958 A | 5/1999 | Dick et al. | |
| 6,161,913 A | 12/2000 | Childers et al. | |
| 7,105,441 B2 * | 9/2006 | Derderian et al. | 438/680 |
| 7,651,570 B2 * | 1/2010 | Brcka | 118/726 |
| 2004/0170984 A1 | 9/2004 | Leproust et al. | |
| 2005/0056216 A1 | 3/2005 | Kuse | |
| 2007/0059128 A1 | 3/2007 | Yudovsky et al. | |
| 2007/0116492 A1 | 5/2007 | Tanabe | |
| 2007/0148206 A1 * | 6/2007 | Demirel et al. | 424/423 |
| 2009/0130719 A1 | 5/2009 | Handique | |
| 2009/0147046 A1 | 6/2009 | Morgan et al. | |
| 2009/0162571 A1 * | 6/2009 | Haines et al. | 427/569 |
| 2009/0263581 A1 | 10/2009 | Martin, III et al. | |
| 2009/0263641 A1 | 10/2009 | Martin, III et al. | |
| 2010/0028065 A1 | 2/2010 | Konno | |
| 2010/0081104 A1 | 4/2010 | Hein et al. | |
| 2010/0285218 A1 | 11/2010 | Conroy et al. | |
| 2010/0304028 A1 | 12/2010 | Sowinski et al. | |
| 2011/0262740 A1 | 10/2011 | Martin, III et al. | |
| 2013/0174410 A1 | 7/2013 | Stevens et al. | |
| 2014/0134091 A1 * | 5/2014 | Ceran | 423/349 |
| 2014/0253144 A1 * | 9/2014 | Novak et al. | 324/550 |
| 2014/0335271 A1 | 11/2014 | Dempster et al. | |

OTHER PUBLICATIONS

Jahangiri, Mehdi, et al., "Preparatio of a new absorbent from activated carbon and carbon nanofiber (AC/CNF) for manufacturing organic-vacbpour respirator cartridge". Iranian Journal of Environmental Health Sciences & Engineering 2013, 10:15, pp. 1-8.*

United States Patent and Trademark Office, as the International Searching Authority, "International Search Report and Written Opinion," mailed May 6, 2013, in related PCT application No. PCT/US2013/020858.

Taiwan Intellectual Property Office, "Search Report," mailed Jul. 29, 2014, in related Taiwan patent application No. 102100871.

United States Patent and Trademark Office, Acting as the International Searching Authority, "International Search Report and Written Opinion," mailed Jan. 14, 2015 in international patent application No. PCT/US2014/048602.

* cited by examiner

PRECURSOR SUPPLIES, MATERIAL PROCESSING SYSTEMS WITH WHICH PRECURSOR SUPPLIES ARE CONFIGURED TO BE USED AND ASSOCIATED METHODS

CROSS-REFERENCE TO RELATED APPLICATION

This application claims the benefit of priority under 35 U.S.C. §119(e) to U.S. Provisional Application No. 61/585, 150, filed Jan. 10, 2012 and titled PRECURSOR SUPPLIES, MATERIAL PROCESSING SYSTEMS WITH WHICH PRECURSOR SUPPLIES ARE CONFIGURED TO BE USED AND ASSOCIATED METHODS, the entire disclosure of which is, by this reference, incorporated herein.

TECHNICAL FIELD

The present disclosure relates generally to apparatus and techniques for providing precursor materials of an organic polymer to an apparatus for processing the precursor materials and for depositing a material that includes the organic polymer. In more specific embodiments, this disclosure relates to apparatus and techniques for supplying parylene dimers to a parylene deposition system.

SUMMARY

In various aspects and embodiments, the present disclosure relates to the manner in which precursor materials are provided to processing equipment and, more specifically, to the manner in which precursor materials of organic polymers are delivered to systems for forming and, in some embodiments, depositing the organic polymers. As used herein, the term "precursor" includes the precursor material of an organic polymer, which may be provided in a pure or substantially pure form (e.g., at least 90% pure, at least 95% pure, at least 98% pure, at least 99% pure, at least 99.9% pure, etc.), and to mixtures of precursors and any additives (or their precursors). Methods for supplying precursors are also disclosed. Thus, this disclosure relates to various aspects of apparatus and methods for supplying precursors to material processing system, such as a deposition system.

In one aspect, the disclosure relates to precursor supplies, which comprise vehicles for delivering a precursor material to a material processing system, such as a deposition system or other processing equipment. In some embodiments, the precursor supply may also include additives to the organic polymer, or the precursors of such additives. A precursor supply may include a carrier for the precursor. The carrier may, in some embodiments, comprise, consist essentially of or consist of a solid or substantially solid mass of precursor material. In some embodiments, a support element may carry the precursor. A carrier may, in some embodiments, comprise a container that holds the precursor.

The precursor supply may comprise, consist essentially of or even consist of a solid or substantially solid mass (accounting for any porosity of the resulting structure or where the density of the precursor supply is, for any other reason, less than or equal to the density of the precursor material in its natural state; e.g., from the nature in which the material packs, etc.) of precursor, in which particles of the precursor may be held together; e.g., in a cake, etc. A precursor supply that comprises a solid or substantially solid mass may be formed to a desired solid shape or a substantially solid shape (e.g., a short, cylindrical puck or disk shape; a brick; a long cylindrical shape (e.g., log, rod, etc.); truncated pyramids or cones (which may be introduced into a material processing system in an upright orientation or in an inverted orientation; etc.), or smaller structures (e.g., pellets, balls, etc.).

Particles of a precursor supply that comprises, consists essentially of or consists of a solid or substantially solid mass may be held together by merely packing the precursor material (e.g., under pressure, heat, etc.). In such embodiments, the precursor material may act as a binder. Alternatively, a binder may hold particles of the precursor material together. A carrier that comprises a binder may hold particles of the precursor in the desired shape, and maintain the desired shape of the precursor supply during its storage, transportation and use. In some embodiments, the binder may comprise a material that will disintegrate or decompose when subjected to conditions under which the precursor is prepared, or processed, for deposition. Alternatively, the binder material may remain present at a location where the precursor material is introduced into, or at an input of, a material processing system and, thus, require subsequent removal from that location. In other embodiments, as the precursor material is drawn into the material processing system (e.g., by evaporation, etc.) and, thus, it may be incorporated into a film that results from the precursor material.

A carrier that comprises a support may enable a precursor supply to be configured in a shape that resembles the support. A support with a three-dimensional shape may carry a precursor in a way that defines a precursor with a three-dimensional shape similar to that of the support. As another example, when a support that has been configured as an elongated ribbon carries a precursor, the resulting precursor supply may also comprise an elongated ribbon. A support that comprises a film or sheet may define a film or sheet shaped precursor supply. Substantially two-dimensional embodiments of precursor supplies (e.g., ribbons, sheets, etc.) may be configured to be continuously fed into a material processing system. In embodiments of precursor supplies that include supports, a binder may secure the precursor to the support and to other quantities (e.g., particles, etc.) of the precursor.

When the carrier of a precursor supply comprises a container, the container may hold the precursor in a flowable form (e.g., in particles, powder, pellets, etc.). In some embodiments, the container may comprise a package that will withstand conditions in which the precursor material is vaporized and enable vaporized precursor material to escape the package. The container may, in other embodiments, comprise a cartridge specifically configured to be received and engaged by a correspondingly configured receptacle of a material processing system; thus, the container may include one or more features that are shaped to ensure that the proper type(s) of precursor is (are) used with a particular type of material processing system, that the container is properly inserted into the material processing system, or the like. One or more features of a container (e.g., identification, security or communication features, such as a radiofrequency identification device (RFID), a near field communications (NFC) tag, a bar code, a quick response code (QR code); a magnetic strip, a memory device, a hologram, a mechanical interlock, an electrical interlock, etc.) may be detected and/or scanned, read or otherwise recognized and/or communicated with by an appropriate element on a material processing system to ensure that the proper type(s) of precursor is (are) used with that material processing system, communicate the type(s) of precursor material being introduced into the material processing system (which may be programmed to present certain options to a system operator based on the type(s) of precursor materials that is (are) presented), communicate instructions and/or programming on operation of the material processing system, ensure that a precursor is only used prior to an expiration date, etc.

A container of a precursor supply may include one or more features that provide for desired, or tailored, processing rates (e.g., uniform or substantially uniform processing rates, processing rates that follow a set profile, etc.) throughout the entire use of the precursor supply (e.g., as long as the precursor supply includes precursor, etc.). A shape of a reservoir of the container may be configured to provide for tailored process rates. A material from which the container, or at least a portion of the container, is formed (e.g., a thermally conductive material that substantially uniformly conveys thermal energy, such as a ceramic material, a metallic material; etc.) may enable the precursor to be withdrawn from the container at a desired rate, or in accordance with a predetermined profile. Heating elements (e.g., thermally conductive structures, such as pins, rods, shelves, fins, or other shapes; optical heating elements; etc.), may be positioned adjacent to a reservoir of the container, extend into the reservoir, or otherwise be positioned in a manner that enables heating of the reservoir and/or its contents in a desired manner (e.g., to ensure that the precursor has a substantially uniform temperature, a desired non-uniform temperature profile, etc.), which may enable uniform or tailored processing parameters (e.g., vapor pressure, evaporation rate, etc.).

Other embodiments of precursor supplies (e.g., those with carriers that comprise binders, those with carriers that comprise supports, etc.) may also have external shapes that contribute to the uniformity of a processing rate (e.g., the vapor pressure of the precursor material as it is removed from the precursor supply, the rate at which the precursor is evaporated, etc.). A number of other factors may also influence the uniformity with which a precursor material is withdrawn from the precursor supply, such factors may include, but are certainly not limited to, the manner in which a precursor material is distributed throughout the precursor supply.

In some embodiments, a precursor supply may include a single precursor material, which may be uniformly distributed (e.g., have a uniform concentration, etc.) throughout its volume. In other embodiments, the precursor material may be distributed throughout the precursor supply in a gradient (e.g., with the highest concentration at a surface from which the precursor material is to be initially withdrawn, etc.). In still other embodiments, a precursor supply may include a plurality of different types of precursor materials. The different precursor materials of such an embodiment may be substantially discrete from one another (e.g., a lower layer of Parylene C and an upper layer of Parylene D, etc.), they may be separate, at opposite locations and optionally combined in varying amounts (e.g., in a gradient, mixed transition, etc.) between those opposite locations, or they may be blended with one another (e.g., homogeneously, etc.).

In its various embodiments, a precursor supply may include a premeasured quantity of precursor. The premeasured quantity may, in some embodiments, include a sufficient amount of precursor material to coat a single load of substrate (e.g., electronic devices under fabrication, etc.) or another whole number of substrate loads.

Examples of precursor materials include, without limitation, various types of Parylene dimers, which are precursors to various types of Parylene polymers, or Poly(p-xylylene). Among the various types of precursors to poly(p-xylylene) that may be used in a precursor supply are precursors to unsubstituted poly(p-xylylene) (e.g., Parylene N) and precursors to substituted poly(p-xylylene) (e.g., Parylene C, Parylene D, Parylene AF-4, Parylene SF, Parylene VT-4, Parylene CF, Parylene HT, Parylene A, Parylene AM, Parylene X, etc.).

A variety of additives may be included in a precursor. Additives may perform a variety of functions, including, without limitation, affecting or providing a particular process condition, such as enhancing temperature uniformity throughout a quantity of a precursor material; imparting a deposited material with a desired property (e.g., toughness, flexibility, porosity, vapor transmission, etc.); providing an indicator function (e.g., visibility, source identity, security, etc.); or any other function that may be desired in the deposited polymer. Some non-limiting examples of additives that may be included in a precursor include boron nitride (BN) (e.g., hexagonal BN, etc.), tracer materials (e.g., dyes, fluorescent materials, selectively reflective materials, etc.) that may be detected by known techniques (e.g., visually, spectrographically, etc.), and the like.

Methods for preparing a precursor material for delivery to a material processing system include measuring a quantity of the precursor material, optionally mixing the precursor material with a binder, an additive and/or at least one other precursor material, and optionally defining a concentration gradient of the precursor material. The precursor material may be incorporated into a precursor supply by way of a carrier (e.g., a binder, a support, a container, etc., or any combination of carriers). The precursor supply may be specifically configured for use with a particular type of material processing system. The precursor supply may be packaged for storage and/or transportation.

Methods for delivering a precursor material, along with any additives, to a material processing system include introducing a precursor supply having a predefined configuration into a corresponding receptacle of the material processing system. The material processing system may withdraw the precursor (e.g., by evaporation, etc.) at a uniform or substantially uniform rate, which may persist throughout substantially the entire volume (i.e., until only a residual amount (e.g., two percent or less, one percent or less, etc.) of the weight or volume) of the precursor supply remains.

In some embodiments, the material processing system may recognize whether or not the precursor supply is configured for use with the material processing system. If there is an attempt to use a precursor supply that has not been configured for use with the material processing system, the material processing system may provide an alert to an operator of the material processing system, or a send an alert to personnel of a facility in which the material processing system is being used, to a provider of the material processing system, or to a party from which the operator of the material processing system is obligated to obtain the precursor.

Embodiments of methods for recovering and using residual precursors are also disclosed. Such a method may include recovering residual precursors from the material processing system. In embodiments where a precursor supply that comprises a container (e.g., a cartridge, etc.) is introduced into a material processing system, the container may be recovered, any remaining (e.g., residual, etc.) precursor may be recovered therefrom, and the container may be cleaned and processed for subsequent reuse or disposal. Any precursor that may have been recovered from the container may be collected and repackaged in another container, or used in any other precursor supply.

Other aspects, as well as features and advantages of various aspects, of the disclosed subject matter will become apparent to one of ordinary skill in the art though consideration of the ensuing description, the accompanying drawings and the appended claims.

DETAILED DESCRIPTION

FIGS. 1 through 5 depict various embodiments of precursor supplies that may be used to deliver a precursor material to processing equipment, such as a system for forming and, optionally, depositing an organic polymer.

Regardless of how a precursor supply is embodied, it includes one or more precursors of another, product material. Without limitation, the precursor may include precursor material of an organic material. In a specific embodiment the precursor material may include a precursor (e.g., a dimer, etc.) to a Parylene material (i.e., unsubstituted or substituted poly(p-xylylene).

In some embodiments, a precursor may include a plurality of precursor materials, which may be kept separately from one another, at least partially mixed (e.g., in a graded manner, etc.) or homogeneously mixed. The manner in which two or more precursor materials are combined may affect the manner in which they form a product, such as an organic polymer. For example, they may be arranged to sequentially form different products, which may be discrete from one another or gradually transition from one material to another. As another example, the product materials may be simultaneously formed and, in some embodiments, interspersed with one another.

In addition to a precursor material, a precursor may include one or more additives. Additives may perform a variety of functions, including, without limitation, affecting or providing a particular process condition, such as enhancing temperature uniformity throughout a quantity of a precursor material; imparting a deposited material with a desired property (e.g., toughness, flexibility, porosity, vapor transmission, etc.); providing an indicator function (e.g., visibility, source identity, security, etc.); a material that generates heat when exposed to certain conditions (e.g., oxygen, etc.); or any other function that may be desired in the deposited polymer. Some non-limiting examples of additives that may be included in a precursor include boron nitride (BN) (e.g., hexagonal BN, etc.), tracer materials (e.g., dyes, fluorescent materials, selectively reflective materials, etc.), and the like.

In its various embodiments, a precursor supply may include a premeasured quantity of precursor. The premeasured quantity may, in some embodiments, include a sufficient amount of precursor material to coat a single load of substrate (e.g., electronic devices under fabrication, etc.) or another whole number (e.g., 2, 3, 4, 5, etc.) of substrate loads.

Figure 1:
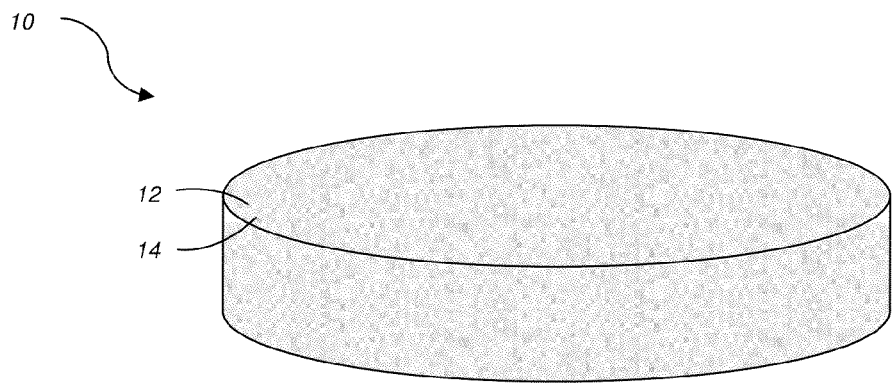
FIG. 1 illustrates an embodiment of a precursor supply that comprises a cake; such an embodiment may include a solid or substantially solid mass of particles of a precursor.

The precursor supply 10 shown in FIG. 1 comprises a solid or substantially solid mass that includes a precursor 12. In some embodiments, a natural affinity of the materials (e.g., precursor material(s), any additives, etc.) and/or processing (e.g., the use of heat and/or pressure, etc.) of the precursor 12 may hold particles of the precursor 12 together in the solid or substantially solid mass.

In other embodiments, a binder 14, or "carrier," may be added to the precursor 12 to facilitate formation of the solid or substantially solid mass and to hold particles of the precursor material together in the solid or substantially solid mass. A binder 14 may comprise a material that will disintegrate or decompose when subjected to conditions under which the precursor is prepared, or processed, for deposition. In other embodiments, as the precursor material is drawn into the material processing system (e.g., by evaporation, etc.), the binder may comprise a material that remains at a location where the precursor supply was introduced into the material processing system.

In the illustrated embodiment, the precursor supply 10 has a disk, or puck, shape. Of course, other shapes of precursor supplies 10 are also within the scope of this disclosure. Such shapes may include, but are not limited to, rectangular prisms, or "bricks," longer cylindrical shapes (e.g., logs, rods, etc.); truncated pyramids or cones, and the like. Various embodiments of precursor supply 10 shapes may be configured to provide for certain processing characteristics (e.g., vapor pressure, uniform processing rates, processing rates following a predetermined profile, etc.). Alternatively, the precursor supply 10 may comprise smaller units; for example, pellets or another desirable shape that may be continuously fed into a material processing system.

Figure 2:
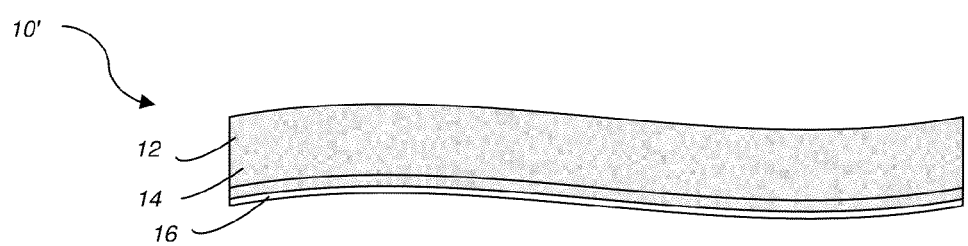
FIG. 2 shows an embodiment of precursor supply in which a precursor is carried by a support, such as the depicted elongated tape, or ribbon.

FIG. 2 illustrates an embodiment of a precursor supply 10' in which a precursor material 12 is carried by a support 16, which is also referred to herein as a "carrier." In some embodiments, the precursor supply 10' may also include a binder 14, which may adhere the precursor material 12 to the support 16 and/or hold particles of the precursor material 12 together. The support 16 may, at least partially, define a shape of the precursor supply 10'.

In the depicted embodiment of precursor supply 10', the support 16 is an elongated tape, or ribbon, providing a basis for the tape-like configuration of the precursor supply 10'. In other embodiments, the support 16 may be shaped as a film. In still other embodiments, the support 16 may have more of a three-dimensional shape. Intricately shaped supports 16 may provide bases for precursor supplies 10' that have similarly intricate shapes.

Figure 3:
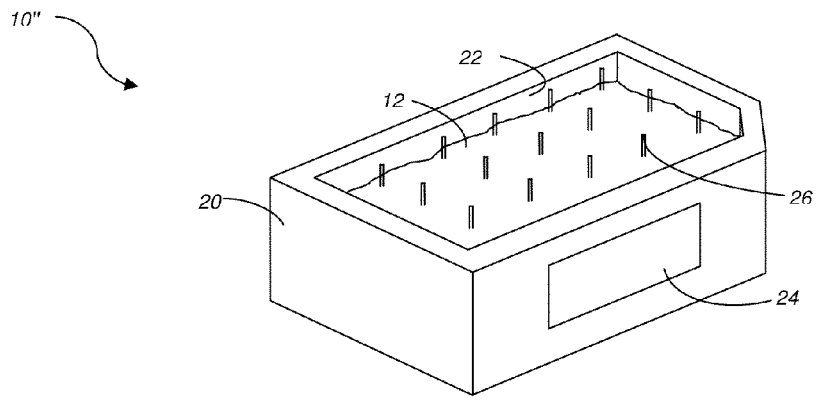
FIG. 3 depicts an embodiment of precursor supply that includes a container with a reservoir for holding a quantity of a precursor.

As shown in FIG. 3, an embodiment of a precursor supply 10'' that comprises a container 20, such as the depicted cartridge, is illustrated. The container 20 of a precursor supply 10'' may also be referred to herein as a "carrier." The container 20 includes a reservoir 22 for receiving a quantity of precursor 12. In some embodiments, the precursor 12 within the reservoir 22 may be in a flowable form (e.g., in particles, powder, pellets, liquids, etc.). In other embodiments, the precursor 12 within the reservoir 22 may comprise a solid or substantially solid mass.

The container 20 may be formed from any suitable material (e.g., a ceramic material, a metal, a polymer, etc.). The container 20 may be configured for multiple uses; i.e., it may be cleaned and/or recycled. Some configurations of containers 20 may seal the precursor 12 from external conditions (e.g., atmospheric conditions, human contact, etc.) during storage, transportation, and handling, as well as during introduction of the precursor supply 10'' into a material processing system.

The container 20 may, as in the depicted embodiment, comprise a cartridge. Such a container 20 may be specifically configured (e.g., shaped, include one or more features that are shaped, etc.) to be received and engaged by a correspondingly configured receptacle of a material processing system.

One or more communication features 24, or identifiers, of the container 20 (e.g., identification, security or communication features, such as a radiofrequency identification device (RFID), a near field communications (NFC) tag, a bar code, a quick response code (QR code); a magnetic strip, a memory device, a hologram, a mechanical interlock, an electrical interlock, etc.) may be detected and/or scanned, read or otherwise recognized and/or communicated with by a corresponding feature (e.g., a reader, scanner, communication element, etc., of a type compatible with the communication feature 24 and known in the art) of a material processing system to ensure that the proper type of precursor 12 is used with that material processing system, that a precursor 12 is only used prior to an expiration date, etc. A communication feature 24 may communicate information about the precursor 12 in the container 20 to a material processing system. Without limitation, a communication feature 24 may ensure that the proper type(s) of precursor is (are) used with a particular type of material processing system. A communication feature 24 may communicate additional information about the precursor to a processing element of a material processing system. Depending upon the type and configuration of the communication feature 24, the communication feature 24 may store, contain or otherwise embody that information and/or the communication feature 24 may function as a portal that communicates information from (and, optionally, to) an external, even remote, source (e.g., a central database, a cloud computing network, etc.). Optionally, by communicating information about the precursor 12 to a processing element of a material processing system, a communication feature 24 may enable the processing element (e.g., in response to programming of the processing element, etc.) to present an operator of the material processing system with certain options that correspond to that precursor 12. A communication feature 24 may cause a processing element of a material processing system to automatically initiate certain programming (e.g., programming that causes the material processing system to operate in a prescribed manner, etc.) or communicate programming to a processing element of a material processing system.

The container 20 may include one or more features that provide for tailored processing rates (e.g., uniform or substantially uniform processing rates throughout the entire use of the precursor supply 10" (e.g., as long as the reservoir 22 of the container 20 includes a useful amount of precursor 12, etc.); processing rates that follow a predetermined profile; etc.). For example, a shape of the reservoir 22 may be configured to provide for tailored processing. As another example, a material from which the container 20, or at least a portion of the container 20 is formed (e.g., a thermally conductive material that substantially uniformly conveys thermal energy, such as a ceramic material; etc.) may enable the precursor 12 to be withdrawn from the container at a desired rate, or in accordance with a desired withdrawal rate profile. Heating elements 26 may be associated with the reservoir 22 of the container in a manner that distributes temperature in a desired manner throughout the precursor 12. The heating elements 26 may be configured to operate in a manner that ensures that the precursor 12 is processed uniformly or in accordance with a desired profile (e.g., withdrawn, evaporated, etc., from the reservoir 22 at a uniform or substantially uniform rate, in accordance with a predetermined rate profile, etc.). Operation of the heating elements may be independent from or under control of a processing element of the material processing system. Without limitation, heating elements 26 may be located adjacent to the reservoir 22 or extend into the reservoir. The heating elements 26 may, without limitation, comprise thermally conductive elements formed from thermally conductive material, optically conductive elements, or have any other suitable structure(s). Various examples of configurations for the heating elements 26 include, but are not limited to, pins, rods, shelves, fins, or other shapes.

In some embodiments, the container 20 may be configured to capture or retain any residue of the precursor 12 that may be generated as material is withdrawn from the reservoir 22. In some embodiments, the capture or retention of precursor 12 residue may reduce or eliminate the need for cleaning one or more components of the material processing system with which the precursor supply 10" is used.

Figure 4:
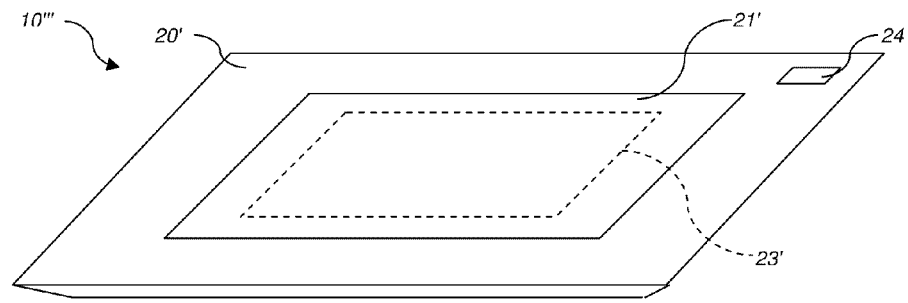
FIG. 4 illustrates another embodiment of a container for holding a quantity of a precursor.

Another embodiment of precursor supply 10''' is illustrated by FIG. 4. The precursor supply 10''' includes a container 20' for containing a precursor 12. The container 20' may be configured to be introduced into a material processing system along with the precursor 12 (FIGS. 1 through 3) and, thus, to introduce the precursor into the material processing system.

In the specific but non-limiting embodiment shown in FIG. 4, the container 20' comprises a package (e.g., an envelope, a box, etc.). In addition to including a reservoir (e.g., the inside of the package, etc.—not shown) configured to hold a quantity of the precursor 12 (FIGS. 1 through 3), the container 20' may be configured to enable transportation (e.g., shipping, etc.) and storage of the precursor 12. When the container 20' is used to store or transport the precursor 12, a sealing element 21' may cover a portion of a surface of the container 20'. The sealing element 21' may be removably secured to the container 20'. In a specific embodiment, the sealing element 21' may comprise a label (e.g., a shipping label, a label that provides information about the contents of the container 20' (e.g., the precursor 12, etc.) of their use, etc.).

The sealing element 21' may cover one or more passageways 23' through the container 20' that enable transmission of the precursor 12 (FIGS. 1 through 3) from the reservoir (not shown) within the container 20' to an exterior of the container 20'. In some embodiments, a plurality of passageways 23' may extend through the container 20'. Non-limiting examples of passageways 23' include perforations or holes, permeable or semi-permeable materials (e.g., screens, filter paper, porous polymers, etc.) and the like. Alternatively, a container 20' may include a single passageway 23', such as a single opening or window through a portion of the container 20'.

During storage or transportation of the container 20' and its contents (e.g., the precursor 12 (FIGS. 1 through 3), etc.), the sealing element 21' may cover each passageway 23' to prevent removal of the contents of the reservoir (not shown) from the container 20' through one or more passageways 23'. When removal of the contents from the container 20' is desired (e.g., to deposit a coating (e.g., a protective coating, a moisture-resistant coating, etc.) onto a substrate, etc.), the sealing element 21' may be removed from a remainder of the container 20' to expose one or more passageways 23'. The contents of the container 20' may then be transported from the reservoir, through one or more passageways 23' to an exterior of the container 20' (e.g., when exposed to certain conditions, such as conditions that will vaporize the precursor 12, etc.). In embodiments where a portion of the contents of the container 20' remain in the reservoir, the sealing element 21' may be repositioned over the passageway(s) 23' and secured in place thereover until further access to the contents of the container 20' is desired.

A precursor supply 10''' with a container 20' configured as a package may also include a communication feature 24. A communication feature 24 may be carried by the container 20'; for example, the communication feature 24 may be located within the reservoir of the container 20', secured to the container 20', printed on the container 20' or formed as part of the container 20'.

In various embodiments, the precursor supply 10, 10', 10", 10''' may provide for a zero discharge coating system.

Figure 5:
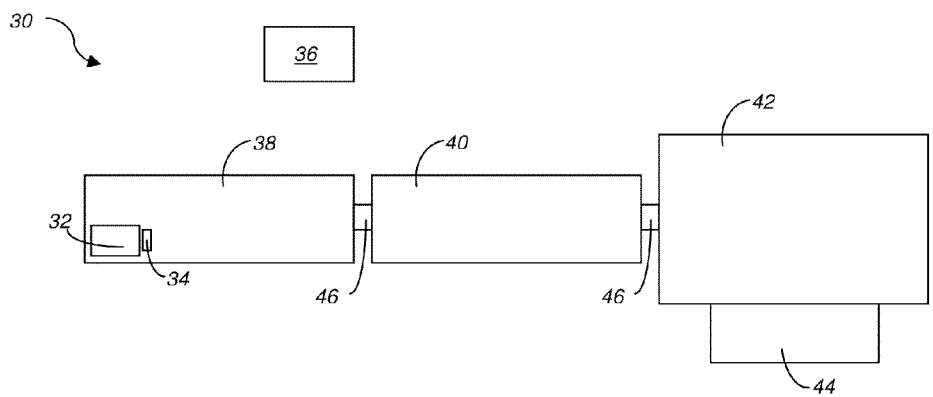
FIG. 5 illustrates a material processing system with which a precursor supply may be used.

Reference is now made to FIG. 5, which depicts an embodiment of a material processing system 30 with which a precursor supply, such as the embodiments of precursor supplies 10, 10', 10", 10''' depicted by and described in reference to FIGS. 1 through 4, may be used. The material processing system 30 includes a receptacle 32 for receiving a precursor supply 10, 10', 10", 10'''. In various embodiments, the material processing system 30 may include features such as those disclosed by U.S. patent application Ser. No. 13/736,753, filed on Jan. 8, 2013 and titled SYSTEMS FOR ASSEMBLING ELECTRONIC DEVICES WITH INTERNAL MOISTURE RESISTANT COATINGS ("the '753 Application") and be incorporated into an assembly system, such as that disclosed by the '753 Application, or into another assembly, manufacturing or fabrication facility. The entire disclosures of the '753 Application is, by this reference, incorporated herein.

The receptacle 32 may be configured to receive precursor 12 in a compact, flowable form (e.g., pellets, balls, etc.). Such a precursor 12 may be dropped, placed or pushed into the receptacle 32 by any suitable means for introduction.

Alternatively, the receptacle 32 may comprise means for continuously introducing precursor 12 into the material processing system 30. Such means for continuously introducing precursor 12 may be configured to drive a continuous or semi-continuous element (e.g., an elongated ribbon, sheet, tube, cylinder, etc.) into the material processing system 30.

As another alternative, the receptacle 32 may be configured to only receive precursor supplies 10, 10', 10", 10''' of predetermined configurations (e.g., with appropriate sizes and shapes, with approved identification and/or security features, etc.). In some embodiments, the receptacle 32 may also be configured to define an orientation in which the precursor supply 10, 10', 10", 10''' is introduced and, thus, to prevent misintroduction of the precursor supply 10, 10', 10", 10'''.

In any event, the receptacle 32 may include means for maintaining a pressure (e.g., a negative pressure, or vacuum, etc.) within the material processing system. Non-limiting examples of means for maintaining the pressure include load lock systems, sealing rings (e.g., O-rings, etc.) for continuous feed systems, and other mechanical isolation means.

A material processing system 30 may also include a detection element 34, which may interact with an additive of the precursor 12 (FIGS. 1 through 3) (e.g., a tracer, etc.) or a communication feature 24 (FIG. 3). The detection element 34 may be configured to detect or derive information from the precursor supply 10, 10', 10", 10'''.

Information detected or derived by the detection element 34 of a material processing system 30 may be conveyed to a processing element 36 (e.g., a computer, etc.) of or associated with the material processing system 30. If the information conveyed to the processing element 36 does not correspond to expected information, the processing element 36 may take any of a variety of different actions. As a non-limiting example, in response to receiving incorrect information or no information (e.g., if the precursor supply 10, 10', 10", 10''' lacks a communication feature 24, if the precursor supply 10, 10', 10", 10''' has been improperly positioned within the receptacle 32, if the precursor supply 10, 10', 10", 10''' includes the wrong precursor, etc), the processing element 36 may, prevent operation of one or more processing stations (e.g., an evaporation chamber 38, a pyrolysis chamber 40, a deposition chamber 42, etc.) of the material processing system 30. The processing element 36 may provide an operator with a warning that the precursor supply 10, 10', 10", 10''' has been improperly introduced into the receptacle 32 or that an improper precursor supply 10, 10', 10", 10''' has been introduced into the receptacle 32.

A detection element 34 may receive information from a communication feature 24 of a container 20, 20' (FIGS. 3 and 4). That information may be conveyed to the processing element 36, which may process the information and take appropriate action, if any. As a non-limiting example, the detection element 34 may receive information from a communication feature 24 on the type of precursor 12 contained within a container 20, 20'. Upon receiving that information, the processing element 36 may compare it to expected information (e.g., information about a type of precursor 12 that may be used with the material processing system 30). Operation of the material processing system 30 may be dependent upon receipt of appropriate information. In other examples, the information conveyed from the communication feature 24 to the detection element 34 and by the detection element 34 to the processing element 36 may enable the processing element 36 (e.g., in response to receiving information about the mass and/or volume of precursor 12 supplied to the material processing system 30, in response to programming of the processing element 36, etc.) to present an operator of the material processing system 30 with certain options that correspond to that precursor 12, cause the processing element 36 to automatically initiate certain programming (e.g., programming that causes the material processing system 30 to operate in a prescribed manner, etc.) or communicate programming to the processing element 36. The processing element 36 may also communicate with other processing elements in a manufacturing or assembly line.

Optionally, the processing element 36 may send messages to remotely located parties. As a few examples, the processing element 36 may convey messages to personnel or other equipment in a facility in which the material processing system 30 is being used, to a provider of the material processing system 30, to a designated provider of maintenance and/or repair services for the material processing system 30 or to a party from which the operator of the material processing system 30 is obligated to obtain the precursor. Examples of the types of messages that may be conveyed may include prompts for an operator of the material processing system 30 to select from a variety of options; warnings for the operator of the material processing system 30; reports to the provider of the material processing system 30 on use of the system, including information that may be useful in determining whether scheduled maintenance should be performed, information on unscheduled maintenance that should be performed, information that enables the provider and a supplier of the precursor to correlate use of the material processing system 30 with the amount of precursor purchased from the supplier, etc.; etc.

A material processing system 30 may also include one or more components, which may be associated with the receptacle 32 or other parts of the system, for monitoring an amount of precursor 12 (FIGS. 1 through 3) that remains in the receptacle 32. Such information may be useful for quality control purposes (e.g., verifying process rates, etc.), for providing information that may be used to introduce more precursor 12 into the receptacle 32, for inventory control, and/or for any other suitable purpose.

In a specific embodiment, the material processing system 30 may comprise a system for depositing an organic polymer, such as the type of system disclosed by U.S. patent application Ser. Nos. 12/104,080, 12/104,152 and 12/988,103, the entire disclosure of each of which is, by this reference, hereby incorporated herein. In a more specific embodiment, such an apparatus may be configured to deposit a Parylene. The embodiment of material processing system 30 depicted by FIG. 5 includes an evaporation chamber 38, which communicates with, and is configured to receive a precursor material from, the receptacle 32. A pyrolysis chamber 40 is located downstream from the evaporation chamber 38. Reactive species may be drawn from the pryolysis chamber into a deposition chamber 42, which may communicate with a vacuum pump 44 (other vacuum pumps may, of course, be associated with the evaporation chamber 38 and the pyrolysis chamber 40) and other elements that may facilitate polymerization and the deposition of an organic polymer onto a substrate. One or more valves 46, which may operate under control of the processing element 36, may control the flow of materials through the material processing system 30.

In various embodiments, the precursor supply 10, 10', 10", 10''' and the receptacle 32 of a material processing system 30 may be configured to minimize any interruption to the vacuum drawing materials through the material processing system 30. The receptacle 32 and the precursor supply 10, 10', 10", 10''' may be configured to feed the precursor 12 (FIGS. 1 through 3) batch-wise or continuously into the material processing system 30. By way of example, load lock systems, sealed rotary valve feeders or other means may be employed.

Various embodiments of apparatus, systems and methods disclosed herein may improve the manner in which precursor materials are processed (e.g., evaporated, pyrolyzed and deposited, etc.). For example, an apparatus, system and/or method of this disclosure may provide for precise process control, including control over process rates (e.g., uniform process rates, process rates that follow a predetermined profile, etc.). The disclosed apparatus, systems and/or methods may also enable processing (e.g., conformal coating of a large number of substrates, such as electronic components, electronic component assemblies, electronic devices, etc.).

Although the foregoing description contains many specifics, these should not be construed as limiting the scope of the disclosed subject matter or of any of the appended claims, but merely as providing information pertinent to some specific embodiments that may fall within the scopes of the claims. Features from different embodiments may be employed in combination. In addition, other embodiments of the disclosed subject matter may also be devised which lie within the scopes of the appended claims. The scope of each claim is, therefore, indicated and limited only by the plain language of that claim and the legal equivalents to the subject matter recited by that claim. All additions, deletions and modifications to the disclosed subject matter that fall within the meanings and scopes of the claims are to be embraced by the claims.

What is claimed:

1. A method for introducing a precursor supply into a system for depositing a film comprising an organic polymer, the method comprising:
introducing a cartridge specifically configured for use with a particular material processing system into a receptacle of the particular material processing system, the cartridge including a reservoir containing a precursor material and heating elements within the reservoir of the cartridge for enabling distribution of thermal energy throughout the reservoir and throughout the precursor material within the reservoir.

2. The method of claim 1, further comprising:
detecting an identifier on the cartridge.

3. The method of claim 2, further comprising:
rejecting the cartridge if the cartridge lacks an identifier or if the identifier does not provide valid information; and
preventing operation of the particular material processing system if the cartridge lacks an identifier or if the identifier does not provide valid information.

4. The method of claim 2, further comprising:
operating the particular material processing system to process the precursor material to deposit a film comprising an organic polymer if the cartridge includes an identifier that provides valid information.

5. The method of claim 4, wherein:
introducing the cartridge comprises introducing into the receptacle of the particular material processing system a cartridge formed from a thermally conductive material; and
operating the particular material processing system comprises conveying thermal energy through the cartridge to the precursor material within the reservoir of the cartridge.

6. The method of claim 5, wherein:
introducing the cartridge further comprises introducing into the receptacle of the particular material processing system a cartridge that includes heating elements within the reservoir of the cartridge; and
operating the particular material processing system further comprises causing the heating elements to distribute thermal energy throughout the reservoir and throughout the precursor material within the reservoir.

7. The method of claim 1, wherein introducing the cartridge comprises introducing into the receptacle of the particular material processing system a cartridge with a shape that is complementary to a shape of at least a portion of the receptacle.

8. The method of claim 7, wherein introducing the cartridge comprises introducing into the receptacle of the particular material processing system a cartridge with a shape that is configured to be engaged by at least a portion of the receptacle.

9. The method of claim 1, wherein introducing the cartridge comprises introducing into the receptacle of the particular material processing system a cartridge formed from a thermally conductive material to enable thermal energy to be conveyed through the cartridge to the precursor material within the reservoir of the cartridge.

10. A method for introducing a precursor material into a material processing apparatus for depositing a film comprising a poly(p-xylylene), the method comprising:
introducing a cartridge of a prepackaged precursor supply into a receptacle of the material processing apparatus, the cartridge comprising a thermally conductive material defining a reservoir and heating elements that comprise a thermally conductive material extending into the reservoir to enable thermal energy to be conveyed through the cartridge and throughout the reservoir to a precursor to the poly(p-xylylene) within the reservoir;
operating the material processing apparatus, including heating the cartridge and the heating elements to heat the precursor within the reservoir.

11. The method of claim 10, wherein heating the cartridge and the heating elements comprises heating the precursor substantially uniformly throughout the reservoir.

12. The method of claim 10, further comprising:
after introducing the cartridge of the prepackaged precursor supply into the receptacle, determining whether the cartridge carries a communication feature that confirms that the prepackaged precursor supply is compatible with the material processing apparatus;
if the cartridge carries a communication feature that confirms that the prepackaged precursor supply is compatible with the material processing apparatus, enabling the act of operating the material processing apparatus to occur.

13. The method of claim 12, further comprising:
comparing information from the communication feature with expected information accessible by a processing element of the material processing apparatus.

14. The method of claim 12, wherein enabling the act of operating comprises initiating an operation protocol in accordance with information provided to a processing element of the material processing system by the communication feature.

15. The method of claim 14, wherein initiating the operation protocol is effected automatically by the processing element of the material processing apparatus.

16. The method of claim 14, wherein initiating the operation protocol includes communicating the operation protocol from the communication feature of the prepackaged precursor supply to the processing element of the material processing apparatus.

17. The method of claim 14, wherein initiating the operation protocol comprises causing the processing element of the material processing apparatus to provide an operator of the material processing apparatus with a plurality of operation protocol options.

18. A method for introducing a precursor material into a material processing apparatus for depositing a film comprising a poly(p-xylylene), the method comprising:
introducing a cartridge of a prepackaged precursor supply into a receptacle of the material processing apparatus, the cartridge comprising a thermally conductive material defining a reservoir and heating elements within the cartridge comprising fins that comprise a thermally conductive material, that are oriented vertically and that are distributed throughout the reservoir to enable thermal energy to be conveyed through the cartridge and substantially uniformly throughout the reservoir to a precursor to the poly(p-xylylene) within the reservoir;
operating the material processing apparatus, including heating the cartridge and the heating elements to heat the precursor within the reservoir.

19. The method of claim 18, further comprising:
after introducing the cartridge of the prepackaged precursor supply into the receptacle, determining whether the cartridge carries a communication feature that confirms that the prepackaged precursor supply is compatible with the material processing apparatus;
if the cartridge carries a communication feature that confirms that the prepackaged precursor supply is compatible with the material processing apparatus, enabling the act of operating the material processing apparatus to occur.

20. The method of claim 19, further comprising:
comparing information from the communication feature with expected information accessible by a processing element of the material processing apparatus.

21. The method of claim 19, wherein enabling the act of operating comprises initiating an operation protocol in accordance with information provided to a processing element of the material processing system by the communication feature.

22. The method of claim 21, wherein initiating the operation protocol is effected automatically by the processing element of the material processing apparatus.

23. The method of claim 21, wherein initiating the operation protocol includes communicating the operation protocol from the communication feature of the prepackaged precursor supply to the processing element of the material processing apparatus.

24. The method of claim 21, wherein initiating the operation protocol comprises causing the processing element of the material processing apparatus to provide an operator of the material processing apparatus with a plurality of operation protocol options.

25. A method for introducing a precursor supply into a system for depositing a film comprising an organic polymer, the method comprising:
introducing a cartridge specifically configured for use with a particular material processing system into a receptacle of the particular material processing system, the cartridge being formed from a thermally conductive material and including a reservoir and heating elements within the reservoir, the reservoir containing a precursor material;
detecting an identifier on the cartridge;
if the cartridge includes an identifier that provides valid information, operating the particular material processing system to convey thermal energy through the cartridge and to cause the heating elements to distribute thermal energy throughout the reservoir and throughout the precursor material within the reservoir.

26. The method of claim 25, further comprising:
rejecting the cartridge if the cartridge lacks an identifier or if the identifier does not provide valid information; and
preventing operation of the particular material processing system if the cartridge lacks an identifier or if the identifier does not provide valid information.

27. The method of claim 25, wherein introducing the cartridge comprises introducing into the receptacle of the particular material processing system a cartridge with a shape that is complementary to a shape of at least a portion of the receptacle.

28. The method of claim 27, wherein introducing the cartridge comprises introducing into the receptacle of the particular material processing system a cartridge with a shape that is configured to be engaged by at least a portion of the receptacle.

29. The method of claim 25, wherein introducing the cartridge comprises introducing into the receptacle of the particular material processing system a cartridge formed from a thermally conductive material to enable thermal energy to be conveyed through the cartridge to the precursor material within the reservoir of the cartridge.

30. The method of claim 25, wherein introducing the cartridge comprises introducing into the receptacle of the particular material processing system a cartridge that includes heating elements within the reservoir of the cartridge to enable the heating elements to distribute thermal energy throughout the reservoir and throughout the precursor material within the reservoir.

* * * * *